(12) United States Patent
Vo (10) Patent No.: US 8,226,094 B1
(45) Date of Patent: Jul. 24, 2012

(54) SYSTEMS AND METHODS FOR COMBINATION SCOOTER AND POGO STICK

(76) Inventor: Julius Vo, Irvine, CA (US)

( * ) Notice: Subject to any disclaimer, the term of this patent is extended or adjusted under 35 U.S.C. 154(b) by 0 days.

(21) Appl. No.: 13/010,642

(22) Filed: Jan. 20, 2011

(51) Int. Cl.
*B62M 1/00* (2010.01)
(52) U.S. Cl. .................................. 280/87.041; 482/77
(58) Field of Classification Search .................. None
See application file for complete search history.

(56) References Cited

U.S. PATENT DOCUMENTS

| | | | | |
|---|---|---|---|---|
| 5,125,286 A | * | 6/1992 | Wilson | 74/551.9 |
| 2003/0087732 A1 | * | 5/2003 | Musachia | 482/77 |
| 2003/0132592 A1 | * | 7/2003 | Dombroski | 280/87.01 |
| 2010/0013183 A1 | * | 1/2010 | He | 280/210 |

* cited by examiner

*Primary Examiner* — John Walters
*Assistant Examiner* — James Triggs
(74) *Attorney, Agent, or Firm* — Greenberg Traurig LLP; Franklin D. Ubell (57) ABSTRACT

A combination scooter and pogo stick apparatus comprising a set of handlebars connected to a set of side bars serving as a frame; a spring coil located towards the bottom of the frame; a scooter board having a bottom surface with at least two wheels, the scooter board being arranged at the bottom of the frame; a set of footrests located at the bottom of the frame; a rotational member that controls the positioning of a bottom stubbed portion, the bottom stubbed portion positioned at the bottom-most portion of the frame; and a holding member that latches the scooter board in a vertical position.

8 Claims, 10 Drawing Sheets

SYSTEMS AND METHODS FOR COMBINATION SCOOTER AND POGO STICK

BACKGROUND

The subject disclosure relates to scooters, and more particularly to a combination scooter and pogo stick apparatus.

SUMMARY

According to one illustrative embodiment, a combination scooter and pogo stick apparatus may comprise a set of handlebars connected to a set of side bars serving as a frame; a spring coil located towards the bottom of the frame; a scooter board having a bottom surface with at least two wheels, the scooter board being arranged at the bottom of the frame; a set of footrests located at the bottom of the frame; a rotational member that controls the positioning of a bottom stubbed portion, the bottom stubbed portion positioned at the bottom-most portion of the frame; and a holding member that latches the scooter board in a vertical position.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

Reference in this specification to "one embodiment", "an embodiment", "the present disclosure", or the like, means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not other embodiments.

The present disclosure combines the functionality of both pogo sticks and scooters into one single device. In one embodiment, the combination scooter and pogo stick has a set of handlebars. In one embodiment, the combination scooter and pogo stick has a scooter board portion including wheels and an area for the user to rest his or her feet. In one embodiment, the combination scooter and pogo stick has a stubbed bottom portion, a spring and a foot-pedal bar for the user to rest his or her feet on.

When the user wishes to use the combination scooter and pogo stick as a scooter in "scooter mode" to horizontally or laterally traverse flat or inclined surfaces, the user simply arranges the scooter board portion horizontally and has the stubbed bottom portion stick out horizontally and not contact the ground, wherein the only component of the combination scooter and pogo stick contacting the ground may be the wheels arranged on the bottom portion of the scooter board. The user may also hold on to the handlebars to facilitate horizontal or lateral movement once moving with the combination scooter and pogo stick in "scooter mode".

When the user wishes to use the combination scooter and pogo stick as a pogo stick in "pogo stick mode" to traverse vertical obstacles, move vertically, or to jump up and down in a vertical motion, the user arranges the scooter board portion vertically, latches the scooter board in securely with a holding member, and holds onto the handlebars and uses a spring as well as the stubbed bottom portion to jump up and down in a vertical motion.

In one embodiment, the stubbed bottom portion, or another stubbed bottom portion that may be placed on the combination scooter and pogo stick, may be short enough so that the when the combination scooter and pogo stick is arranged in scooter mode, the shortened stubbed bottom portion does not touch the ground and the only component of the combination scooter and pogo stick that touches the ground are the wheels on the bottom portion of the scooter board. This enables the user to use the combination scooter and pogo stick as both a scooter and a pogo stick simultaneously, at the same time, without having to switch back and forth between "scooter mode" and "pogo stick mode". This may also be known as "joint scooter and pogo stick mode".

Figure 1:
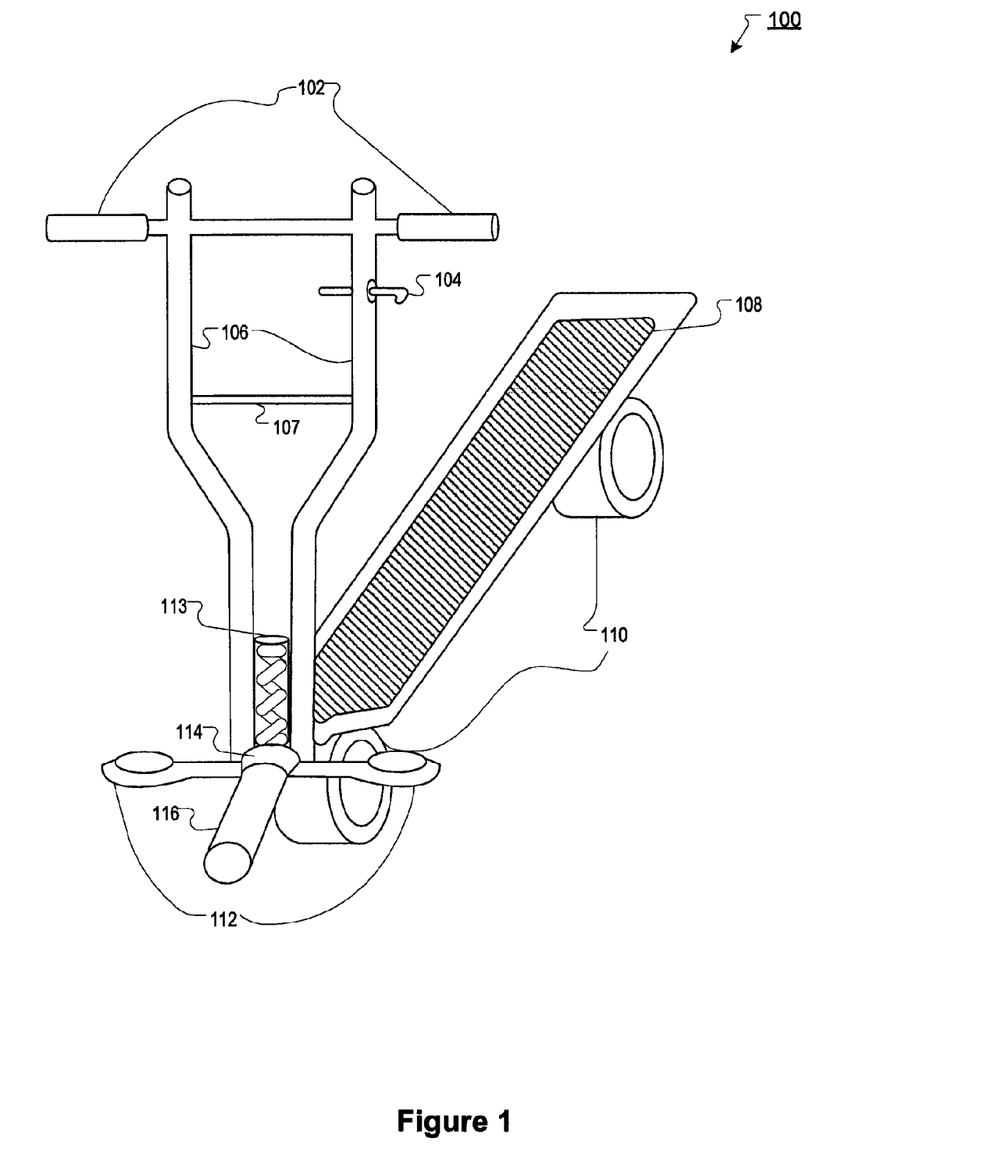
FIG. 1 shows a combination scooter and pogo stick, according to one embodiment.

FIG. 1 shows a combination scooter and pogo stick 100, according to one embodiment. The combination scooter and pogo stick 100 includes handlebars 102, holding member 104, side bars 106, crossbar 107, scooter board 108, wheels 110, footrests 112, spring coil 113, rotational member 114 and stubbed bottom portion or rod 116. The combination scooter and pogo stick 100 is shown in FIG. 1 as being in "scooter mode" where the scooter board 108 is arranged horizontally. Handlebars 102 provide grips for the user to hold on to while using the combination scooter and pogo stick to engage in any type of movement. Grips made of material to secure a safe and secure grip (e.g., rubber, high polymer material, organic and non-organic elastomers, etc.) may be used to cover the external surface of handlebars 102.

Holding member 104 is used to latch in scooter board 108 to operate the combination scooter and pogo stick 100 in "pogo stick mode", as will be described in more detail in connection with FIG. 4. Holding member 104 may be made of any metal, plastic or solid material (e.g., aluminum, chrome, fiberglass, Plexiglas, composites, resins, Kevlar) and that may also be the same material used in other components of the combination scooter and pogo stick 100 (e.g., side bars 106, footrests 112). In one embodiment, holding bar 104 may be arranged on the opposite side bar 106 and may not be arranged on the side bar 106 as shown in FIG. 1. Side bars 106 are used as a securing frame of the combination scooter and pogo stick 100. Side bars 106 may also be made of any metal, plastic or solid material. Crossbar 107 is used to provide additional support for the frame made by the side bars 106 and to provide further support for the combination scooter and pogo stick 100 overall. Crossbar 107 may also be made of any metal, plastic or solid material.

Scooter board 108 is a plane for the user to stand on while operating the combination scooter and pogo stick 100. The surface of the scooter board 108 facing skyward may also be coated with a grip-tape like material that is used to coat the surface of skateboards. The grip-tape material coating scooter board 108 may be made of, for example, silicon carbide, aluminum oxide, or other friction-resistant material. The wheels 110 are rotatably mounted below the scooter board 108 and are used by the combination scooter and pogo stick 100 to allow horizontal or lateral movement. The wheels 110 may be made of, for example, polyurethanes, urethanes, nylon, acetal, plastic materials, similar materials, and composites of any of the above materials or similar materials.

Footrests 112 are available to the user so that the user may rest his or her feet on them: however, even though footrests 112 are primarily used when the combination scooter and pogo stick 100 is arranged in "pogo stick mode", the footrests 112 can still be used when the combination scooter and pogo stick 100 is in "scooter mode". For example, the user may rest his or her foot on one of the footrests 112 while using the other foot to pedal along the ground, or the user may rest a foot or both feet on the footrests 112 while the user is stationary during a period of respite. The footrests 112 may also be utilized by the user when the combination scooter and pogo stick 100 is arranged in "joint scooter and pogo stick mode" to use the pogo stick functionality to travel both vertically and horizontally. The footrests may be made of any metal, plastic or solid material. Spring coil 113 may also be utilized when the combination scooter and pogo stick 100 is arranged in "pogo stick mode" or in "joint scooter and pogo stick mode". Spring coil 113 primarily provides the spring momentum used for the pogo stick functionality of the combination scooter and pogo stick 100 in order to travel vertically or traverse vertical objects. Spring coil 113 may be made of metal plastic, or similar material, but preferably a type of metallic material to provide the safest support when bouncing up and down.

Rotational member 114 adjusts the positioning of bottom stubbed portion 116. In one embodiment, rotational member 114 locks the bottom stubbed portion 116 in a horizontal position when the combination scooter and pogo stick 100 is in "scooter mode". In this fashion, the bottom stubbed portion 116 does not get in the way of the wheels 110 while the combination scooter and pogo stick 100 is traveling horizontally. In one embodiment, rotational member 114 locks the bottom stubbed portion 116 in a vertical position while the combination scooter and pogo stick is in "pogo stick mode".

Figure 7A:
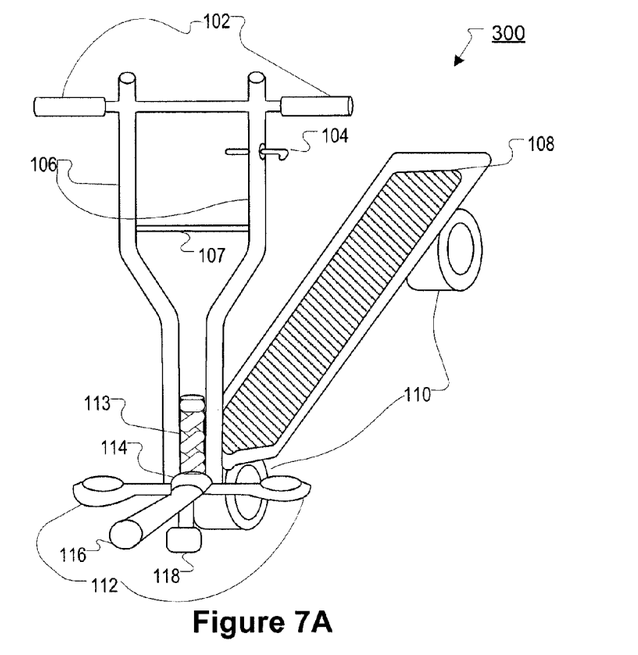
FIG. 7A shows a combination scooter and pogo stick, according to one embodiment.
Figure 7B:
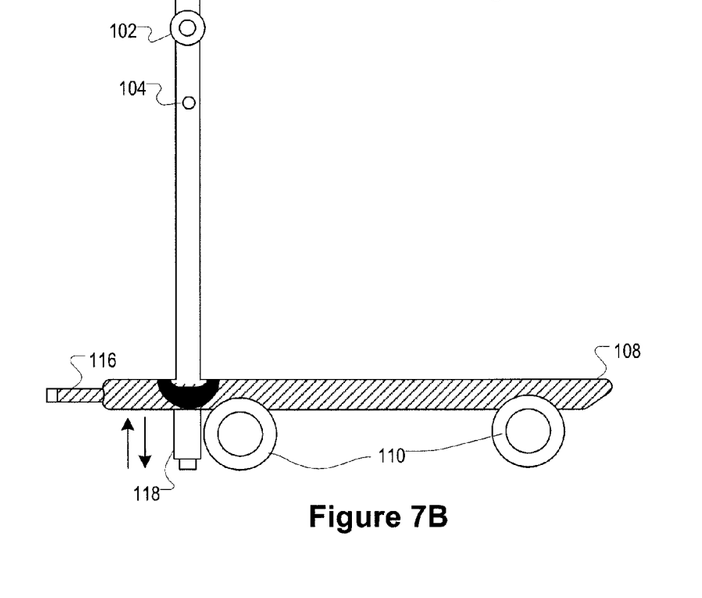
FIG. 7B shows a side view of a combination scooter and pogo stick, according to one embodiment.

In this fashion, the scooter board 108 is latched vertically by the holding member 104 (as will be described in more detail in FIG. 4), and the entire combination scooter and pogo stick 100 may be used as a pogo stick. In this fashion, the user uses the handlebars 102, the spring coil 113 and the footrests 112 to use the combination scooter and pogo stick 100 as a pogo stick in order to bounce up and down on the bottom stubbed portion 116, using the bottom stubbed portion 116 as the main point of contact with the ground in order to bounce up and down vertically. In one embodiment, the rotational member 114 locks the bottom stubbed portion 116 in a horizontal position and a shortened bottom stubbed portion 118 (as shown in FIGS. 7A-7B) is used to enable the combination scooter and pogo stick 100 to perform vertical motion with pogo stick functionality as well as horizontal motion with the scooter board 108 and wheels 110 at the same time. The rotational member 114, the bottom stubbed portion 116 and the shortened bottom stubbed portion 118 may be made of metal, plastic, or solid material. In one embodiment, the bottom-most portion of the bottom stubbed portion 116 or the shortened bottom stubbed portion 118 may be made of rubber or another impact-absorbent material. In one embodiment, the bottom-most portion of the bottom stubbed portion 116 or the shortened bottom stubbed portion 118 may be made of metal, plastic or solid material. In one embodiment, the rotational member 114 may not exist and just a shortened bottom stubbed portion 118 may exist while the bottom stubbed portion 116 is permanently locked in a horizontal position. In one embodiment, the bottom stubbed portion 116 may not exist, and the rotational member 114 may only engage with the shortened bottom stubbed portion 118. In one embodiment, both the rotational member 114 and the bottom stubbed portion 116 may not exist, and only the shortened bottom stubbed portion 116 may exist, which may be locked permanently in vertical form or in horizontal form.

Figure 2:
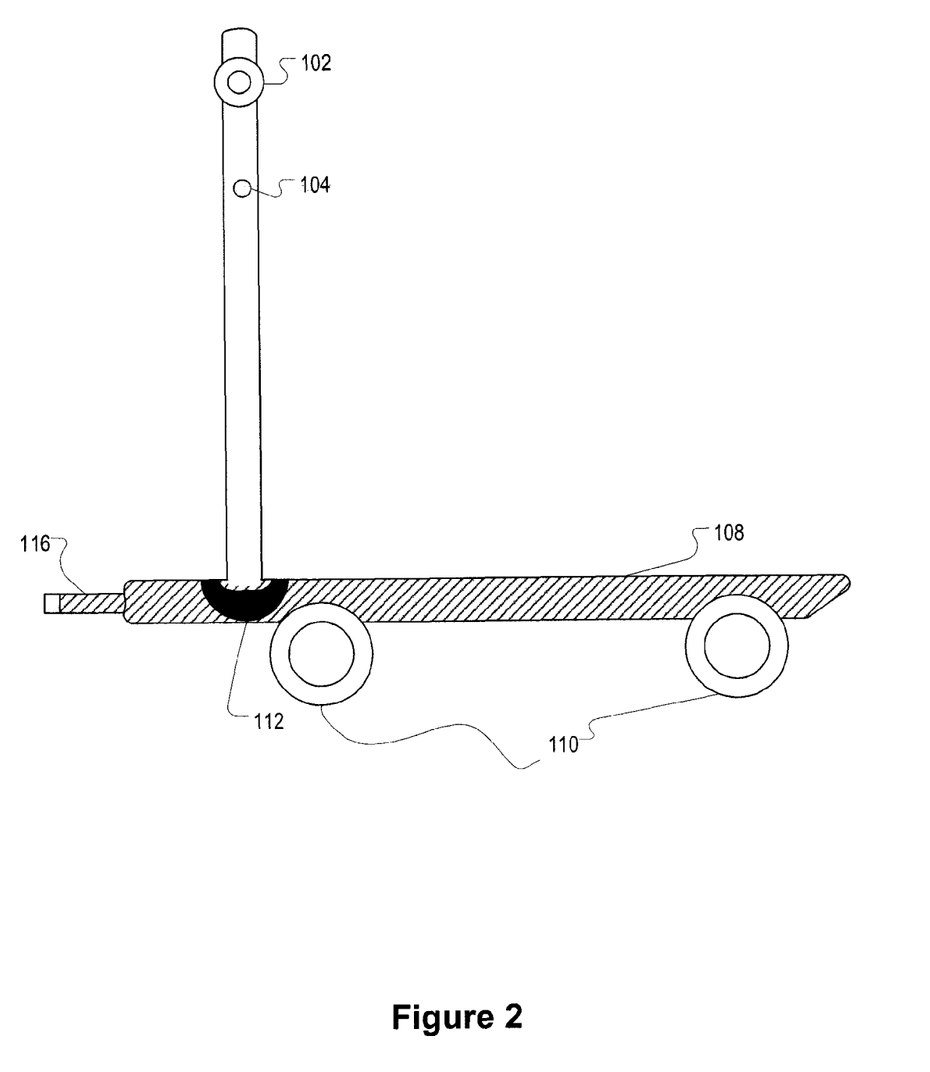
FIG. 2 shows a side view of a combination scooter and pogo stick, according to one embodiment.

FIG. 2 shows a side view of a combination scooter and pogo stick, according to one embodiment. Combination scooter and pogo stick 100, arranged in "scooter mode" is seen from the side, and additional components that can be seen from the side are handlebars 102, holding member 104, scooter board 108, wheels 110, footrests 112 and bottom stubbed portion 116. The side view shows that the combination scooter and pogo stick 100 may be used by the user to travel horizontally. In one embodiment, the user may place one foot on the scooter board 108, his or her hands on the handlebars 102, and use his or her other foot to pedal alongside the ground while the wheels 110 carry the user on the scooter board 108. Then, once enough momentum has been built up, the user may then place both feet on the scooter board 108 and hold onto the handlebars 102 to steer while traveling horizontally. In one embodiment, the user may place one foot on the footrests 112, his or her hands on the handlebars 102, and use his or her other foot to pedal alongside the ground while the wheels 110 carry the user on the scooter board 108. Then, once enough momentum has been built up, the user may then place both feet on the scooter board 108 and use the handlebars 102 to steer while traveling horizontally. In one embodiment, the bottom stubbed portion 116 may be used as a safety bumper to prevent the user from running into obstacles too abruptly. In one embodiment, the bottom stubbed portion 116 may not exist, and rubber padding may exist at the front of scooter board 108 to prevent collisions. In one embodiment, the bottom stubbed portion 116 may be shortened so as to not unduly protrude or hinder movement.

Figure 3A:
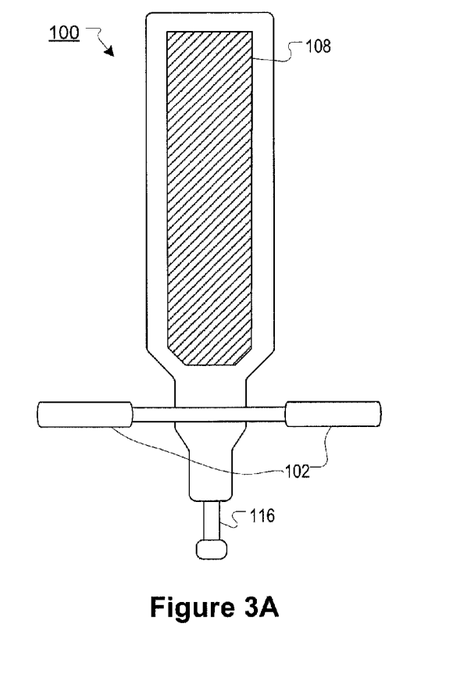
FIG. 3A shows a top view of a combination scooter and pogo stick, according to one embodiment.

FIG. 3A shows a top view of a combination scooter and pogo stick, according to one embodiment. From a top-facing view of the combination scooter and pogo stick 100, the handlebars 102, the scooter board 108, and the bottom stubbed portion 116 can be seen. In one embodiment, grip-tape may be placed on the surface visible of the scooter board 108 so that the user may rest his or her feet on a frictionless or minimal friction surface so as to maximize pedal efficiency (the foot on the scooter board 108 must remain as stationary and as fixed as possible while the other foot not on the scooter board 108 is pedaling), as well as to maximize safety, for instance, to minimize undue motion or slipping once feet are securely arranged on the scooter board 108. The grip-tape material coating scooter board 108 may be made of, for example, silicon carbide, aluminum oxide, or other friction-resistant material. In one embodiment, the bottom stubbed portion 116 may not exist and rubber padding may be placed near the front of the scooter board 108 so as to prevent collisions and maximize the safety of the user. In one embodiment, the bottom stubbed portion 116 may be shortened so as to not unduly protrude or to hinder movement.

Figure 3B:
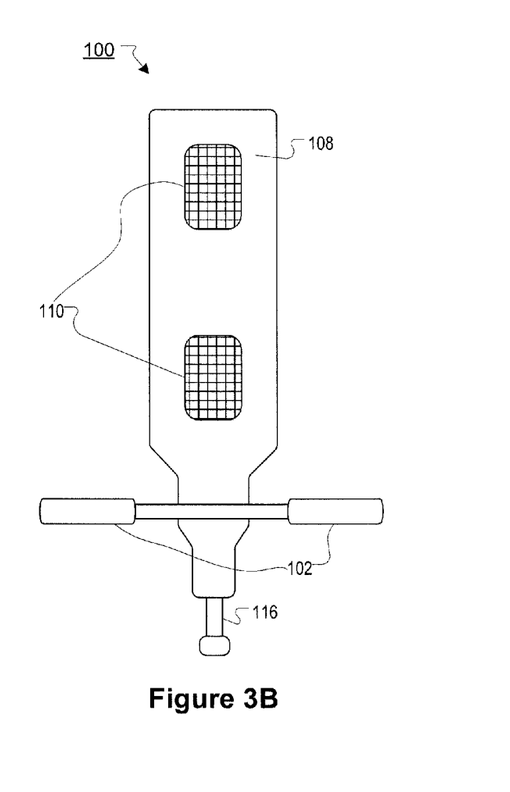
FIG. 3B shows a bottom view of a combination scooter and pogo stick, according to one embodiment.

FIG. 3B shows a bottom view of a combination scooter and pogo stick, according to one embodiment. From a bottom-facing view of the combination scooter and pogo stick 100, the handlebars 102, the scooter board 108, the wheels 110 and the bottom stubbed portion 116 can be seen. Wheels 110 are arranged below the scooter board 108 and are used by the combination scooter and pogo stick 100 to allow horizontal or lateral movement. The wheels 110 may be made of, for example, polyurethanes, urethanes, nylon, acetal, plastic materials, similar materials, and composites of any of the above materials or similar materials. In one embodiment, the bottom stubbed portion 116 may not exist and rubber padding may be placed near the front of the scooter board 108 so as to prevent collisions and maximize the safety of the user. In one embodiment, the bottom stubbed portion 116 may be shortened so as to not unduly protrude or to hinder movement.

Figure 4:
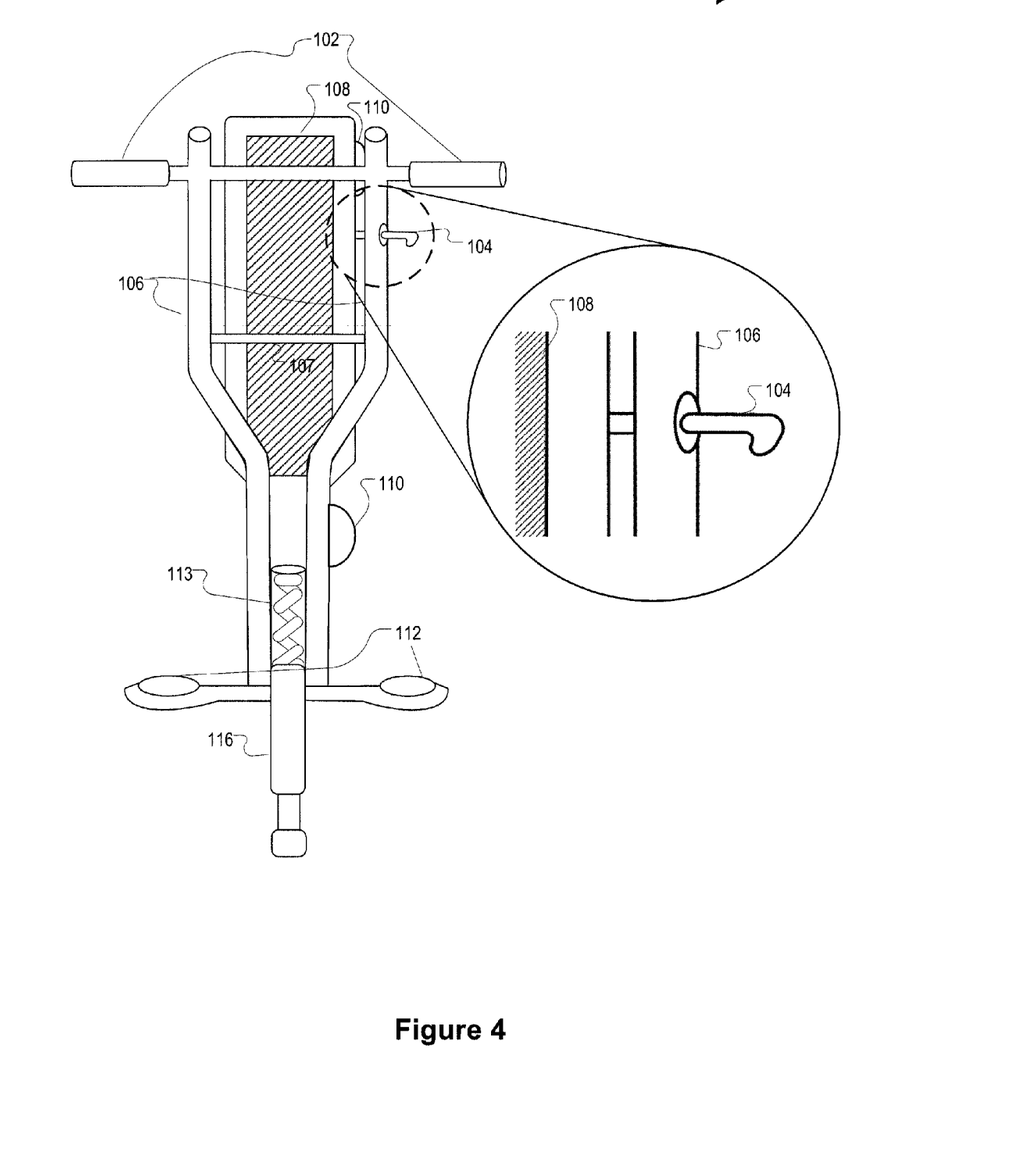
FIG. 4 shows a second top view of combination scooter and pogo stick, according to one embodiment.

FIG. 4 shows a combination scooter and pogo stick 200, according to one embodiment. Combination scooter and pogo stick 200 includes handlebars 102, holding member 104, side bars 106, crossbar 107, scooter board 108, wheels 110, footrests 112, spring coil 113, rotational member 114 and stubbed bottom portion 116. The combination scooter and pogo stick 200 is shown in FIG. 4 as being in "pogo stick mode" where the scooter board 108 is arranged vertically and latched securely in place by holding member 104. In one embodiment, the holding member 104 may be arranged on the opposite side bar 106 than the side bar 106 shown in FIG. 4. The description of the above components are the same as the descriptions of the components in FIG. 1.

As can be seen in more detail in the blown-up portion, the holding member 104 extends from the side bar 106 to behind the scooter board 108 in order to secure the scooter board 108 safely and rigidly so that the scooter board 108 does not move when the combination scooter and pogo stick 200 is being used as a pogo stick. In one embodiment, the holding member 104 may be a simple metal or plastic latch or key that is inserted into a hole wherein the back portion of holding member 104 then extends behind the scooter board 108 to secure scooter board 108 in place. In one embodiment, the holding member 104 may be a bar that extends the entire length from one side bar 106 to another side bar 106 so as to secure the entire back surface of the scooter board 108 (this is shown, for example, in FIG. 8). In one embodiment, the holding member 104 may be a simple bar that can be pulled down from being in an upwards position to a downwards locking position. In one embodiment, the holding member 104 may not be necessary, instead there may be locking mechanism(s) and latches arranged with other components around the combination scooter and pogo stick 200 so as to not require an additional bar or an external bar such as the holding member 104.

When the combination scooter and pogo stick 200 is arranged in "pogo stick mode", the user may grab onto the handlebars 102, rest his or her feet on the footrests 112, and use the spring action of spring coil 113 to bounce up and down and travel vertically, using the bottom stubbed portion 116 as the main point of contact with the ground. The combination scooter and pogo stick 200 then may be used as a pogo stick to bounce up and down, travel vertically and traverse vertical objects (e.g., stairs, objects of smaller height). The scooter components of the combination scooter and pogo stick 200 (e.g., the scooter board 108, the wheels 110) are arranged securely and safely in a vertical position by holding member 104 or some other means so that when the combination scooter and pogo stick 200 is used as a pogo stick to bounce up and down, the scooter components do not shift around and remain safely secured in place.

Figure 5:
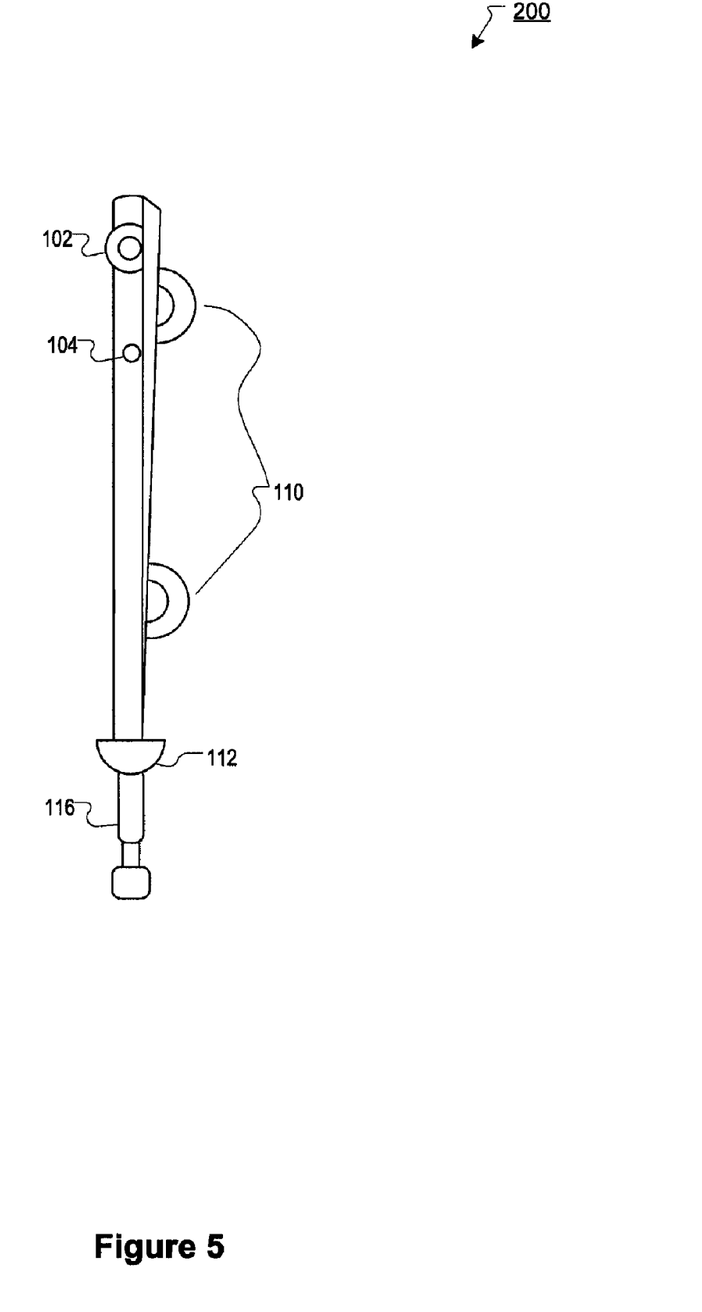
FIG. 5 shows a side view of a combination scooter and pogo stick, according to one embodiment.

FIG. 5 shows a side view of a combination scooter and pogo stick, according to one embodiment. Combination scooter and pogo stick 200, arranged in "pogo stick mode" is seen from the side, and additional components that can be seen from the side are handlebars 102, holding member 104, scooter board 108, wheels 110, footrests 112 and bottom stubbed portion 116. As can be seen by FIG. 5, the scooter board 108 is safely secured by holding member 104 in a vertical position and locked in place. The user then holds on to the handlebars 102, places his or her feet on the footrests 112, and uses the spring action of the spring coil 113 to bounce up and down on the bottom stubbed portion 116 and use the combination scooter and pogo stick 200 as a pogo stick. In one embodiment, the wheels 110 may be small enough so as to not interfere with the front side of the user while the user is using the combination scooter and pogo stick 200 as a pogo stick. In one embodiment, the wheels 110 may fold inwards so as to present a flat surface facing the front side of the user to not interfere with the user's use of the combination scooter and pogo stick 200 as a pogo stick. In one embodiment, mechanism(s) may exist so as to remove or fold-in the wheels 110 so as to present a flat surface facing the front side of the user to not interfere with the user's use of the combination scooter and pogo stick 200 as a pogo stick.

Figure 6A:
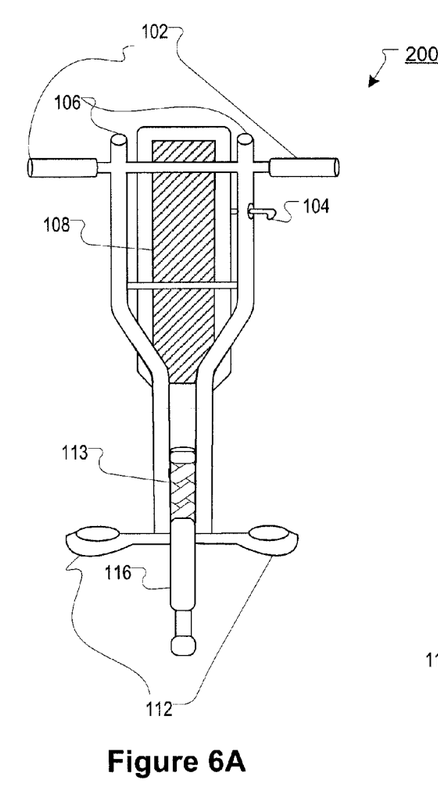
FIG. 6A shows a second front view of a combination scooter and pogo stick, according to one embodiment.

FIG. 6A shows a front view of a combination scooter and pogo stick, according to one embodiment. From a front view of the combination scooter and pogo stick 200, the handlebars 102, the holding member 104, the side bars 106, the scooter board 108, the footrests 112, the spring coil 113 and the bottom stubbed portion 116 may be seen.

The front view of combination scooter and pogo stick 200 emphasizes that the user may hold onto handlebars 102, rest his or her feet on footrests 112 and use the spring coil 113 to bounce up and down on the bottom stubbed portion 116, which serves as the main point of contact with the ground. In one embodiment, the spring coil may be contained in a cylinder into which the stubbed portion telescopically slides up and down.

Figure 6B:
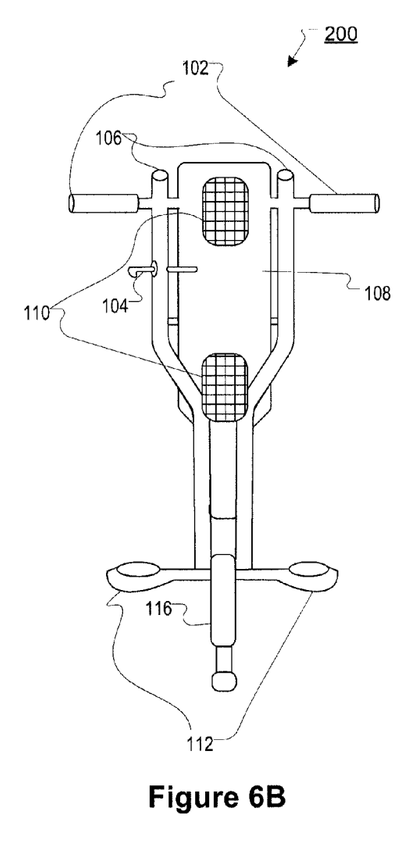
FIG. 6B shows a back view of a combination scooter and pogo stick, according to one embodiment.

FIG. 6B shows a back view of a combination scooter and pogo stick, according to one embodiment. From a back view of the combination scooter and pogo stick 200, the handlebars 102, the holding member 104, the side bars 106, the scooter board 108, the wheels 110, the footrests 112, and the bottom stubbed portion 116 may be seen. As can be seen, holding member 104 extends behind scooter board 108 to safely secure a vertically-arranged scooter board 108 in place. In one embodiment, the holding member 104 may be a simple metal or plastic latch or key that is inserted into a hole wherein the back portion of holding member 104 then extends behind the scooter board 108 to secure scooter board 108 in place. In one embodiment, the holding member 104 may be a bar that extends the entire length from one side bar 106 to another side bar 106 so as to secure the entire back surface of the scooter board 108. In one embodiment, the holding member 104 may be a simple bar that can be pulled down from being in an upwards position to a downwards locking position. In one embodiment, the holding member 104 may not be necessary, instead there may be locking mechanism(s) and latches arranged with other components around the combination scooter and pogo stick 200 so as to not require an additional bar or an external bar such as the holding member 104. In one embodiment, the wheels 110 may be small enough so as to not interfere with the front side of the user while the user is using the combination scooter and pogo stick 200 as a pogo stick. In one embodiment, the wheels 110 may fold inwards so as to present a flat surface facing the front side of the user to not interfere with the user's use of the combination scooter and pogo stick 200 as a pogo stick. In one embodiment, mechanism(s) may exist so as to remove or fold-in the wheels 110 so as to present a flat surface facing the front side of the user to not interfere with the user's use of the combination scooter and pogo stick 200 as a pogo stick.

FIG. 7A shows a combination scooter and pogo stick, according to one embodiment. Combination scooter and pogo stick 300 includes handlebars 102, holding member 104, side bars 106, crossbar 107, scooter board 108, wheels 110, footrests 112, spring coil 113, rotational member 114, stubbed bottom portion 116 and shortened stubbed bottom portion 118. The combination scooter and pogo stick 300 is shown in FIGS. 7A-7B as being in "joint scooter and pogo stick mode" where the scooter board 108 is arranged vertically and latched securely in place by holding member 104, and there is a shortened stubbed bottom portion 118 in order to allow the user to use the combination scooter and pogo stick 300 as both a pogo stick and a scooter. The description of the above components are the same as the descriptions of the components in FIGS. 1 and 4.

The shortened bottom stubbed portion 118 may be used so that the user may bounce up and down vertically with the combination scooter and pogo stick 300 and use the combination scooter and pogo stick 300 as a scooter at the same time. In one embodiment, additional springs may be located immediately below the handlebars 102 to control the extension of the shortened bottom stubbed portion 118 so that the shortened bottom stubbed portion 118 may touch the ground and serve as the main point of contact for bouncing up and down upon.

In one embodiment, the rotational member 114 may not exist and just a shortened bottom stubbed portion 118 may exist while the bottom stubbed portion 116 is permanently locked in a horizontal position. In one embodiment, the bottom stubbed portion 116 may not exist, and the rotational member 114 may only engage with the shortened bottom stubbed portion 118. In one embodiment, both the rotational member 114 and the bottom stubbed portion 116 may not exist, and only the shortened bottom stubbed portion 116 may exist, which may be locked permanently in vertical form or in horizontal form.

FIG. 7B shows a side view of a combination scooter and pogo stick, according to one embodiment. Combination scooter and pogo stick 300, arranged in "joint scooter and pogo stick mode" is seen from the side, and additional components that can be seen from the side are handlebars 102, holding member 104, scooter board 108, wheels 110, footrests 112, bottom stubbed portion 116 and shortened bottom stubbed portion 118. The side view shows that the combination scooter and pogo stick 300 may be used for horizontal movement (with the handlebars 102, the wheels 110 and the user placing their feet on the scooter board 108) and vertical movement (using the handlebars 102, the footrests 112 and the shortened bottom stubbed portion 118).

Figure 8:
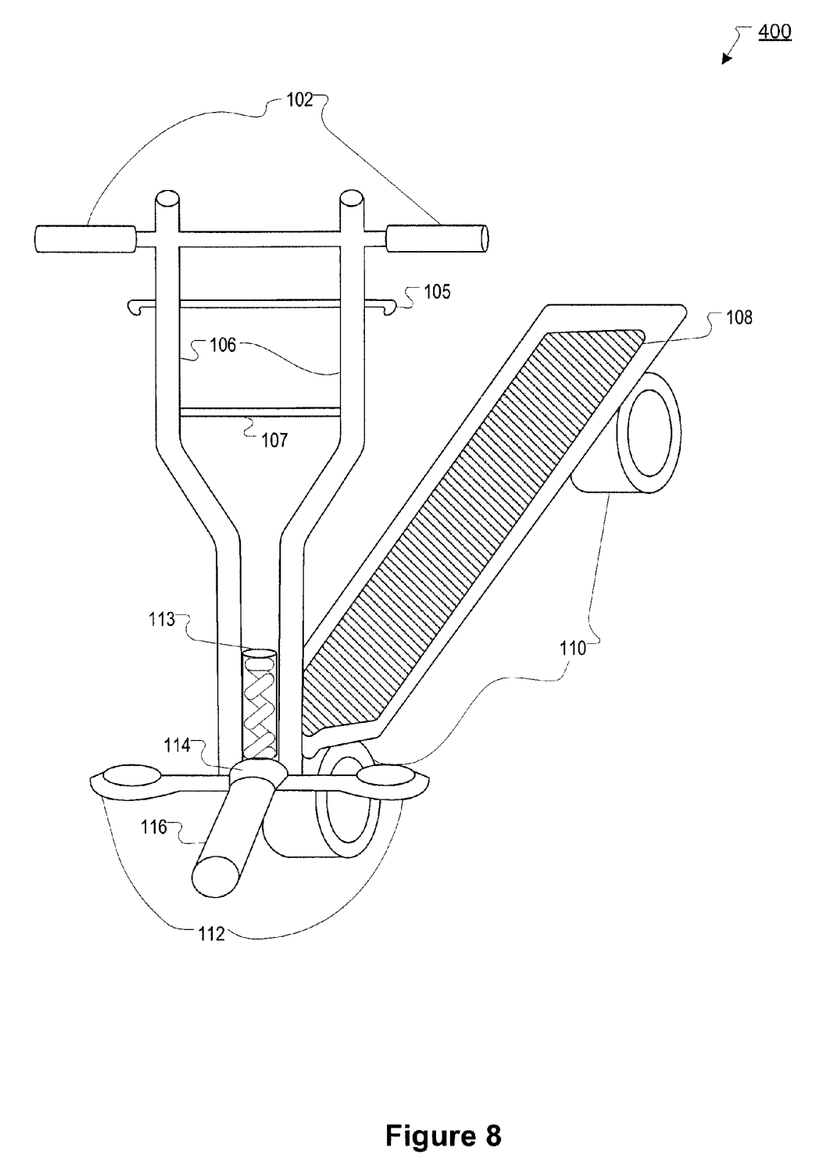
FIG. 8 shows a combination scooter and pogo stick, according to one embodiment.

FIG. 8 shows a combination scooter and pogo stick, according to one embodiment. Combination scooter and pogo stick 400 includes handlebars 102, extended holding member 105, side bars 106, crossbar 107, scooter board 108, wheels 110, footrests 112, spring coil 113, rotational member 114 and bottom stubbed portion 116. The combination scooter and pogo stick 400 is shown in FIG. 8 as being in "scooter mode" where the scooter board 108 is arranged horizontally. All the elements of FIG. 8 are the same as FIG. 1 and FIG. 4, with the exception of extended holding member 105. In one embodiment, extended holding member 105 can be a longer holding bar that extends the entire length of one side bar 106 to the other side bar 106 through holes arranged in each of the side bars 106, different than the holding member 104 shown in FIGS. 1 and 4, for example, which is only arranged on one holding bar 106. In one embodiment, the extended holding member may not be a bar inserted within holes on each of the side bars 106 but may be instead a pull-down latch bar that is in a position that can be left up when the scooter board 108 is down (scooter mode) and latched down when the scooter board 108 is vertical and needs to be latched in place (pogo stick mode). In one embodiment, the extended holding member 105 may not be necessary, instead there may be locking mechanism(s) and latches arranged with other components around the combination scooter and pogo stick 400 so as to not require an additional bar or an external bar such as the extended holding member 105.

Figure 9:
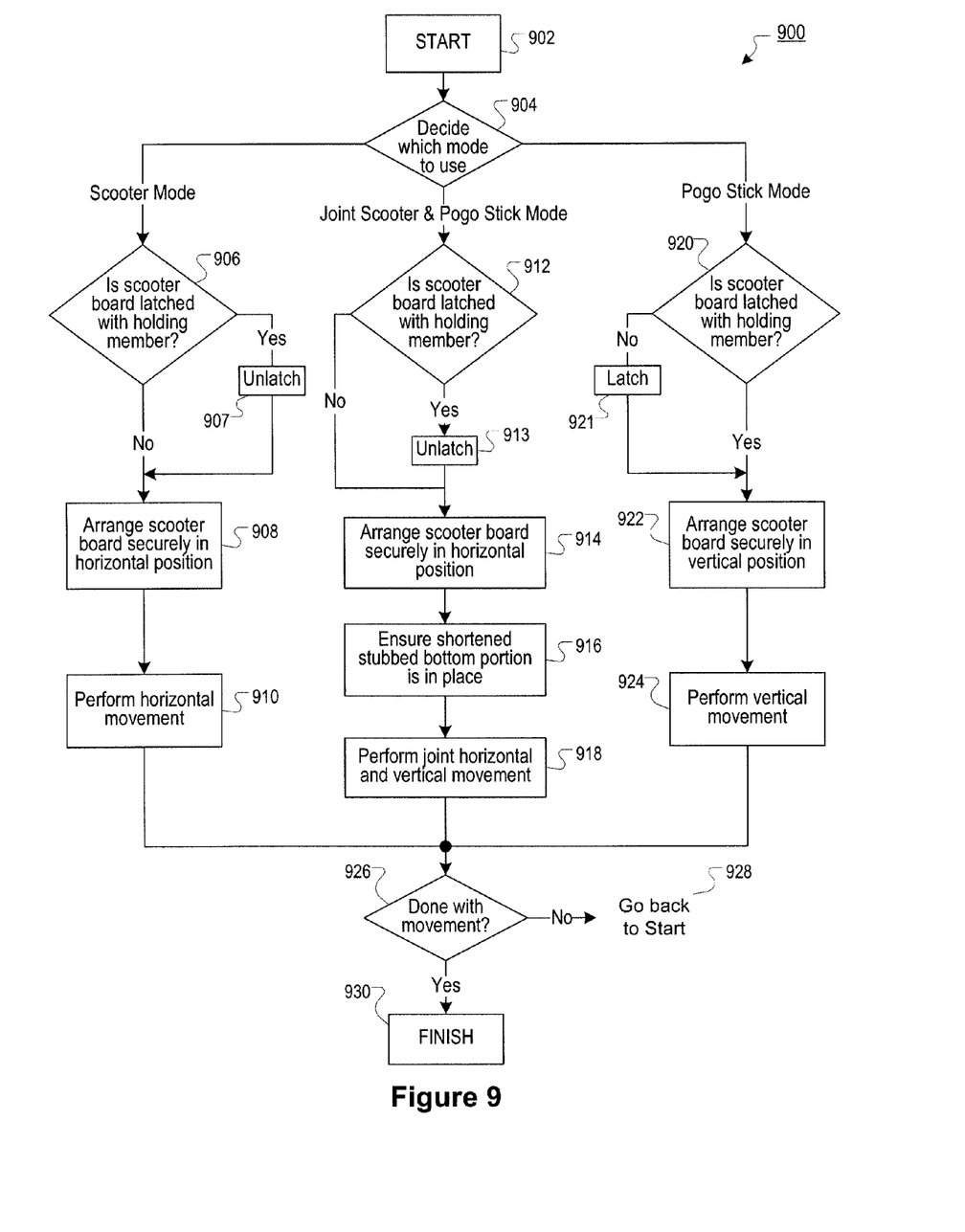
FIG. 9 is a flowchart describing a method to use a combination scooter and pogo stick, according to one embodiment.

FIG. 9 shows a flowchart describing a method to use a combination scooter and pogo stick, according to one embodiment. Method 900 describes a process of using a combination scooter and pogo stick according to one embodiment. In step 902, the method 900 starts. In step 904, the user decides which mode to use. In step 906, the user decides to use "scooter mode" and the user is asked whether or not the scooter board 108 is latched with the holding member 104 or 105. If it is latched, then in step 907, the user unlatches the scooter board 108 from the holding member 104, 105. If the scooter board 108 is not latched, then the user goes on to step 908, where the scooter board 108 is arranged securely in a horizontal position to properly be in scooter mode. Then, in step 910, the user performs horizontal movement 910 with the scooter, which may require the user placing one foot on the scooter board 108 and using his or her other foot to pedal on the ground to increase further motion with the wheels 110. Once enough momentum is built up in the wheels 110, then the user may place both feet on the scooter board 108 and ride the scooter, using the handlebars 102 to steer. In one embodiment, for performing horizontal movement on inclined or sloped surfaces, the user may either use more force or less force from their feet in order to build momentum and travel with the combination scooter and pogo stick in "scooter mode."

From step 904, if the user decided to use the combination scooter and pogo stick in "joint scooter and pogo stick mode", then in step 912 the user must see whether or not the scooter board 108 is latched with the holding member 104, 105. If yes, then the user un-latches the scooter board 108 from the holding member 104, 105 in step 913, and goes on to step 914. If not, then the user goes onto step 914, where the scooter board 108 is arranged securely in a horizontal position, similar to step 908 described above. In step 916, the user then ensures that the shortened stubbed bottom portion 118 is in place. There may be additional springs located below the handlebars 108 that will enable the user to extend the length of the shortened stubbed bottom portion 118 to use as the bottom portion of a pogo stick. Then, in step 918, the user performs joint horizontal and vertical movement, using the combination scooter and pogo stick: using the scooter components (e.g., handlebars 102, scooter board 108, wheels 108) to travel horizontally and using the pogo stick components (e.g., handlebars 102, spring coil 113, shortened stubbed bottom portion 118) to travel vertically.

From step 904, if the user decides to use the combination scooter and pogo stick in "pogo stick mode", then in step 920 the user must see whether or not the scooter board 108 is latched with the holding member 104, 105. If no, then the user latches the scooter board 108 with the holding member 104, 105 in step 921, and goes on to step 922. If yes, then the user goes onto step 922, where the scooter board 108 is arranged securely in a vertical position, once latched by holding member 104, 105. Then, in step 924, the user may perform vertical movement with the combination scooter and pogo stick by using the pogo stick components (e.g., handlebars 102, spring coil 113, bottom stubbed portion 116) of the combination scooter and pogo stick.

In step 926, the user decides whether or not he or she is done with all movement. If not, then the user in step 928 will go back to the start, in step 902. If the user is done, then the user will go to step 930 and finish the entire method 900. In one embodiment, the user may perform all of the above-mentioned steps. In one embodiment, a system may perform all of the above-mentioned steps. In one embodiment, an automated computer may perform all of the above-mentioned steps.

Figure 10:
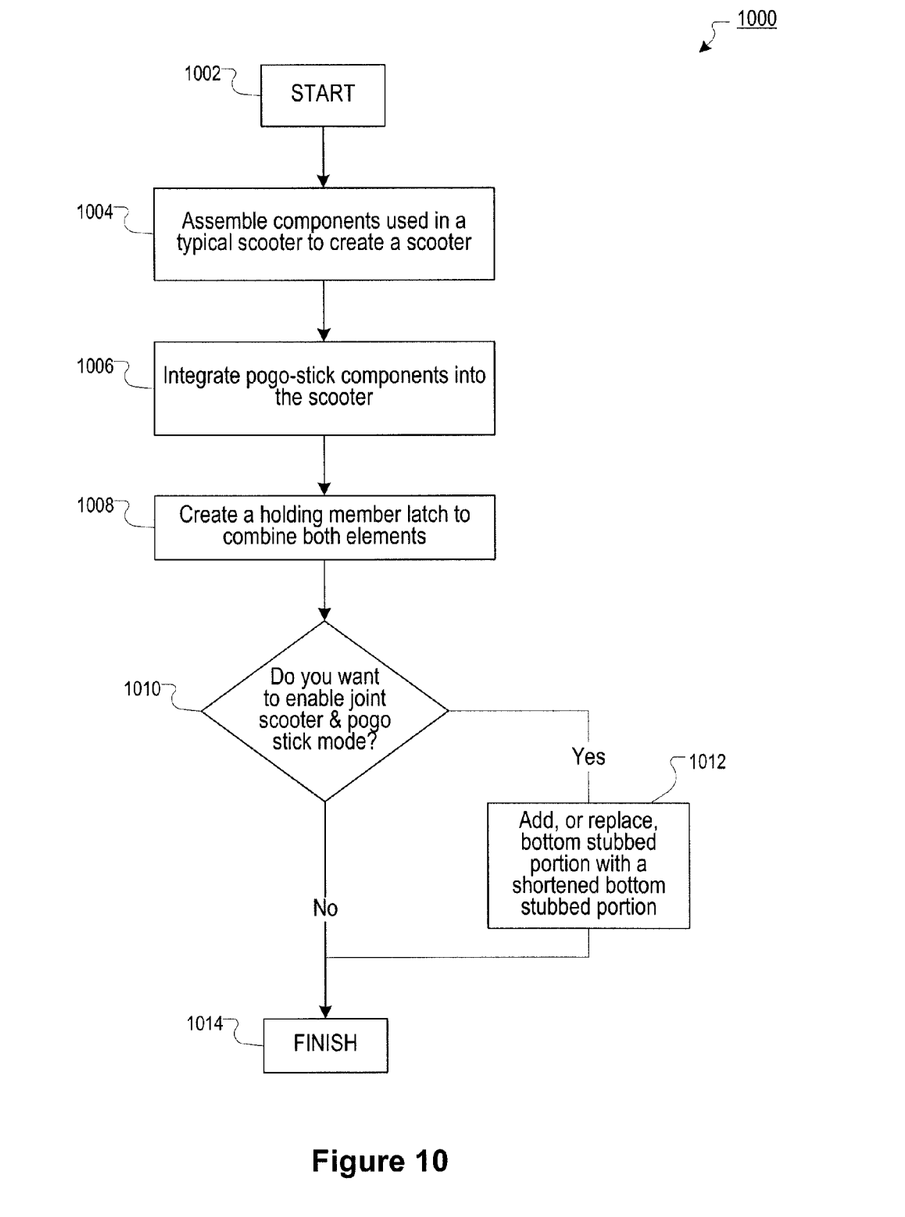
FIG. 10 is a flowchart describing a method to make a combination scooter and pogo stick, according to one embodiment.

FIG. 10 shows a flowchart describing a method to make a combination scooter and pogo stick, according to one embodiment. Method 1000 shows a process of making a combination scooter and pogo stick according to one embodiment. In step 1002, the method 1000 starts. In step 1004, components are assembled that are used in a typical scooter (components such as, for example, handlebars 102, side bars 106, crossbar 107, scooter board 108, wheels 108, footrests 112) to create a scooter. In step 1006, pogo-stick components (components such as, for example, spring coil 113, footrests 112, bottom stubbed portion 116, shortened bottom stubbed portion 118) are integrated into the scooter build in step 1004. In step 1008, a holding member latch (e.g., holding member 104 or extended holding member 105, for example) is created in order to latch the scooter board 108 and to combine both scooter and pogo stick elements into one coherent device, enabling a user to switch between both "scooter mode" and "pogo stick mode" by utilizing the holding member latch. In step 1010, the decision is made of whether or not "joint scooter and pogo stick mode" should be enabled. If this "joint scooter and pogo stick mode" is desired, then in step 1012, the bottom stubbed portion 116 is either replaced with a shortened bottom stubbed portion 118, or the bottom stubbed portion 116 is left (for example, in a permanently horizontal position to serve as a safety brake) and a shortened bottom stubbed portion 118 is added. Then, the shortened bottom stubbed portion 118 may be used alongside all the other above-mentioned components as both a scooter and a pogo stick at the same time in "joint scooter and pogo stick mode". If "joint scooter and pogo stick mode" is not desired, then we go to step 1014, where the method 1000 is finished.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

Similarly, each physical element disclosed should be understood to encompass a disclosure of the action which that physical element facilitates.

What is claimed is:

1. A combination scooter and pogo stick apparatus, comprising:
    a set of handlebars connected to a set of side bars serving as a vertically disposed frame;
    a scooter board having a bottom surface with at least two wheels, the scooter board being arranged at the bottom of the frame and positionable between a horizontal "scooter" position and a vertical "pogo" position;
    a set of footrests located at the bottom of the frame;
    a rotational member that controls the positioning of a bottom stubbed portion, the bottom stubbed portion positioned at the bottom-most portion of the frame and comprising part of an up and down bouncing assembly; and
    a holding member that latches the scooter board in the vertical position.

2. The combination scooter and pogo stick apparatus of claim 1, wherein the set of handlebars has an external coating-layer comprising rubber, high polymer material, organic elastomers, non-organic elastomers, and other similar materials.

3. The combination scooter and pogo stick apparatus of claim 1, wherein the scooter board has a grip-tape surface made of material comprising silicon carbide, aluminum oxide, and other friction-resistant material.

4. The combination scooter and pogo stick apparatus of claim 1, wherein the rotational member positions the bottom stubbed portion in a horizontal position when the holding member is not latching the scooter board in the vertical position.

5. The combination scooter and pogo stick apparatus of claim 1, wherein the rotational member positions the bottom stubbed portion in a vertical position and further wherein the holding member is latching the scooter board in a vertical position.

6. A combination scooter and pogo stick apparatus, comprising:
- a set of handlebars connected to a vertically disposed frame;
- a scooter board having a bottom surface with at least two wheels, the scooter board being pivotally mounted at the bottom of the frame and rotatable between a horizontal scooter board position and a vertical upright pogo position wherein in said vertical pogo position said board lies adjacent said frame;
- a latching or locking mechanism moveable between a latched and an unlatched position wherein, in the latched position said mechanism holds said scooter board in the vertical, upright pogo position; and
- a bouncing mechanism located towards the bottom of the frame and rotatable from a horizontal position to a vertical position.

7. The combination scooter and pogo stick apparatus of claim 1 wherein said bouncing mechanism further comprises a spring.

8. The combination scooter and pogo stick apparatus of claim 6 wherein said bouncing mechanism comprises a spring.

\* \* \* \* \*